US012616252B2

(12) United States Patent
Yoo et al.

(10) Patent No.: US 12,616,252 B2
(45) Date of Patent: May 5, 2026

(54) METHOD AND SYSTEM FOR OUTPUTTING IMAGE FOR VIRTUAL REALITY

(71) Applicant: KT&G CORPORATION, Daejeon (KR)

(72) Inventors: So Hee Yoo, Daejeon (KR); Byeongyong Ahn, Daejeon (KR); Seonbong Lee, Daejeon (KR); Junhui Lee, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 79 days.

(21) Appl. No.: 18/021,995

(22) PCT Filed: Nov. 24, 2022

(86) PCT No.: PCT/KR2022/018659
§ 371 (c)(1),
(2) Date: Feb. 17, 2023

(87) PCT Pub. No.: WO2023/128293
PCT Pub. Date: Jul. 6, 2023

(65) Prior Publication Data
US 2024/0268483 A1 Aug. 15, 2024

(30) Foreign Application Priority Data
Dec. 29, 2021 (KR) ........................ 10-2021-0191373

(51) Int. Cl.
*A24F 40/51* (2020.01)
*A24F 40/65* (2020.01)
(Continued)

(52) U.S. Cl.
CPC .............. *A24F 40/65* (2020.01); *A24F 40/51* (2020.01); *G02B 27/0172* (2013.01);
(Continued)

(58) Field of Classification Search
CPC ..................... G06F 3/03545; G06F 2200/1632
See application file for complete search history.

(56) References Cited

U.S. PATENT DOCUMENTS 6,608,615 B1 * 8/2003 Martins ............... G06F 16/9577
345/157
9,433,242 B1 * 9/2016 Buffone .................. A24F 15/18
(Continued)

FOREIGN PATENT DOCUMENTS

CN 203859549 U 10/2014
JP 2020-503707 A 1/2020
(Continued)

OTHER PUBLICATIONS

International Search Report dated Apr. 7, 2023 from the International Searching Authority in International Application No. PCT/KR2022/018659.
(Continued)

*Primary Examiner* — William Boddie
*Assistant Examiner* — Alecia D English
(74) *Attorney, Agent, or Firm* — Sughrue Mion, PLLC

(57) ABSTRACT

According to an example, a virtual reality device for providing a virtual reality image to a user includes a substrate made of a transparent material, a screen that is disposed on one surface of the substrate and forms a space between the substrate and a lens, and one or more lenses disposed on one end of the screen, wherein the screen includes a plurality of ends capable of adjusting a distance between the substrate and the lenses.

9 Claims, 9 Drawing Sheets

(51) Int. Cl.
G02B 27/01 (2006.01)
G06F 3/01 (2006.01)
G06F 3/14 (2006.01)

(52) U.S. Cl.
CPC .......... G02B 27/0176 (2013.01); G06F 3/011
(2013.01); G06F 3/14 (2013.01)

(56) References Cited

U.S. PATENT DOCUMENTS

| | | | | |
|---|---|---|---|---|
| 11,048,346 B1 * | 6/2021 | Burks | ................... | G06F 1/1616 |
| 2011/0102979 A1 * | 5/2011 | Jinkinson | .............. | G06F 1/1616 |
| | | | | 361/679.01 |
| 2015/0181945 A1 * | 7/2015 | Tremblay | ................ | A24F 40/60 |
| | | | | 131/328 |
| 2016/0011422 A1 * | 1/2016 | Thurber | ................. | G02B 27/64 |
| | | | | 345/8 |
| 2017/0020188 A1 * | 1/2017 | Cameron | ................ | A24F 40/60 |

| | | | | |
|---|---|---|---|---|
| 2018/0116354 A1 * | 5/2018 | Fernando | ................... | A24F 9/16 |
| 2021/0373602 A1 * | 12/2021 | Min | ........................ | H04M 1/21 |

FOREIGN PATENT DOCUMENTS

| | | |
|---|---|---|
| KR | 10-2010-0115679 A | 10/2010 |
| KR | 10-1994297 B1 | 6/2019 |
| KR | 10-2020-0107395 A | 9/2020 |
| KR | 10-2175434 B1 | 11/2020 |
| KR | 10-2021-0091288 A | 7/2021 |
| WO | 2016/133886 A1 | 8/2016 |
| WO | 2020/234059 A1 | 11/2020 |
| WO | 2021/071208 A1 | 4/2021 |

OTHER PUBLICATIONS

Partial Supplementary European Search Report issued Apr. 29, 2024 in European Application No. 22879649.6.
Office Action issued Mar. 19, 2024 in Japanese Application No. 2023-510489.

* cited by examiner

Figures 7, 8:
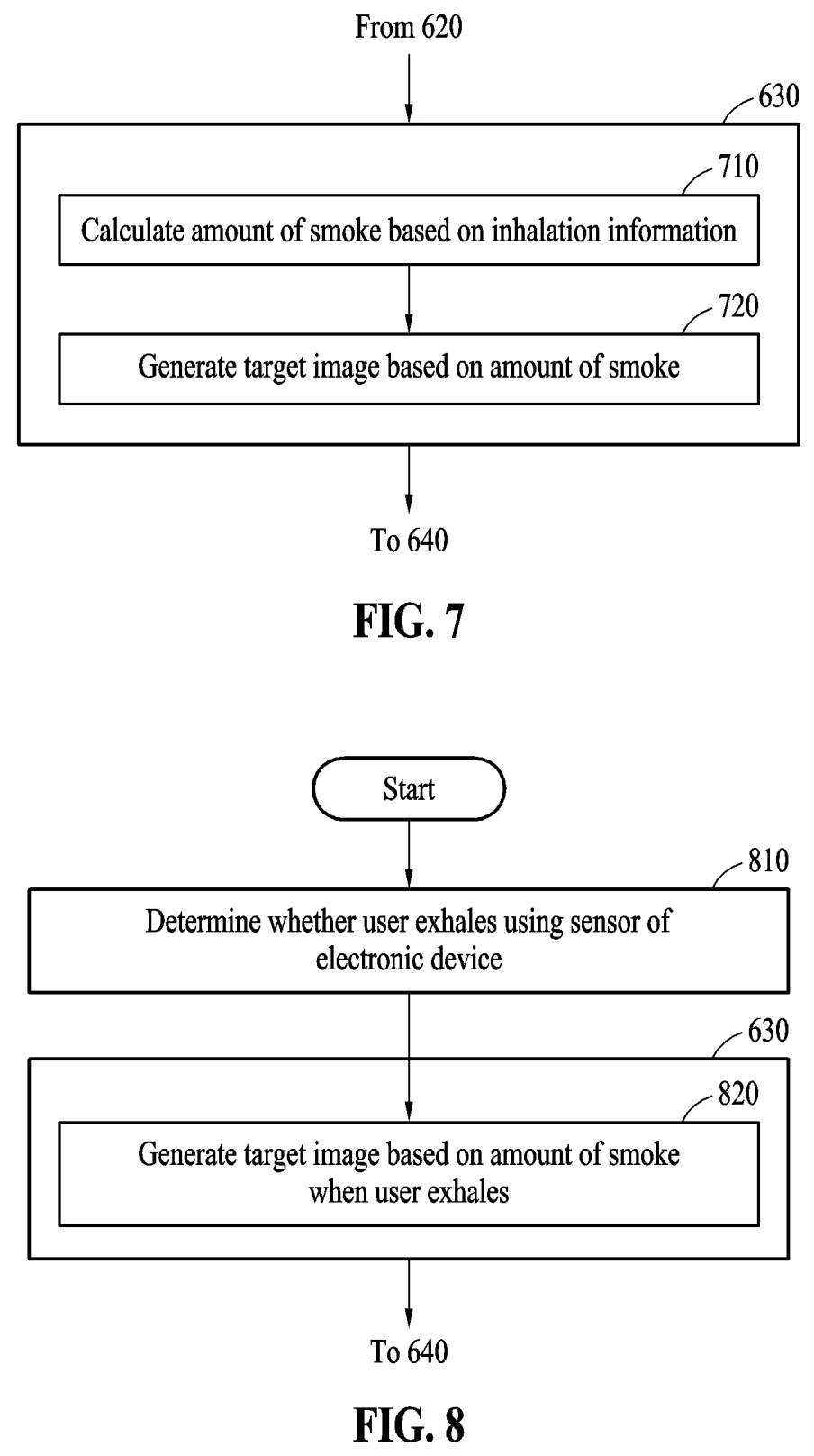

From 620

630

710

Calculate amount of smoke based on inhalation information

720

Generate target image based on amount of smoke

Start

810

Determine whether user exhales using sensor of electronic device

630

820

Generate target image based on amount of smoke when user exhales

METHOD AND SYSTEM FOR OUTPUTTING IMAGE FOR VIRTUAL REALITY

TECHNICAL FIELD

The following embodiments relate to a technology for outputting an image to a user, and more particularly, to a technology for outputting an image to a user using an aerosol generating device.

BACKGROUND ART

These days, there is a gradual rise in the demand for electronic cigarettes. The rising demand for electronic cigarettes has accelerated the continued development of electronic cigarette related functions. The electronic cigarette related functions may include, in particular, functions according to types and characteristics of electronic cigarettes.

DISCLOSURE OF THE INVENTION

Technical Goals

An embodiment may provide a system for outputting an image for virtual reality.

An embodiment may provide a lens for providing virtual reality to a user.

Technical Solutions

According to an embodiment, a virtual reality device may include a substrate made of a transparent material, a screen disposed on a first surface of the substrate and configured to form a space between the substrate and a lens, one or more lenses disposed on a first end of the screen, wherein the screen may include a plurality of ends configured to adjust a distance between the substrate and the lenses, and a first end having a wider cross-sectional area may include a second end having a narrower cross-sectional area therein among the plurality of ends of the screen.

The virtual reality device may further include a fixing member connected to the substrate or the screen and configured to fix the virtual reality device to a face of a user.

The virtual reality device may further include a connector connected to the substrate and configured to provide a connection with an electronic device.

The electronic device may be a mobile communication terminal.

A second surface of the substrate may be connected to the electronic device to touch a display of the electronic device through the connector.

The substrate may rotate with respect to the electronic device about a connecting axis of the connector such that the screen is positioned between the substrate and the electronic device.

An aerosol generating device may be disposed in an inner space of the connector in a state in which the screen is positioned between the substrate and the electronic device.

The aerosol generating device may include a battery, a cartridge including an aerosol generating substrate, a coil configured to heat the cartridge, a sensing unit configured to sense a state of the aerosol generating device, a communication unit configured to transmit information on the state, and a controller configured to control the aerosol generating device, wherein the controller may be configured to generate state information by sensing a state of the aerosol generating device through the sensing unit and transmit the generated state information to the electronic device connected to the aerosol generating device through wireless communication.

According to an embodiment, a virtual reality system may include an electronic device, an aerosol generating device, and a virtual reality device, wherein the aerosol generating device may be configured to generate state information by sensing a state of the aerosol generating device and transmit the generated state information to the electronic device connected to the aerosol generating device through wireless communication, the electronic device may be configured to generate a target image corresponding to the state information and output the target image through a display of the electronic device, and the target image may be transmitted to an eye of a user through the virtual reality device, and virtual reality may be provided to the user.

The aerosol generating device may include a battery, a cartridge including an aerosol generating substrate, a coil configured to heat the cartridge, a sensing unit configured to sense a state of the aerosol generating device, a communication unit configured to transmit the information on the state to an external device, and a controller configured to control the aerosol generating device.

The aerosol generating device may further include a magnet configured to attach the aerosol generating device to one side surface of the electronic device.

The controller may be configured to, when the aerosol generating device is attached to the one side surface of the electronic device, charge the battery through a wireless charging scheme.

The virtual reality device may include a substrate made of a transparent material, a screen disposed on a first surface of the substrate and configured to form a space between the substrate and a lens, and one or more lenses disposed on a first end of the screen, wherein the screen may include a plurality of ends configured to adjust a distance between the substrate and the lens, and a first end having a wider cross-sectional area may include a second end having a narrower cross-sectional area therein among the plurality of ends.

The virtual reality device may further include a connector connected to the substrate and configured to provide a connection with the electronic device.

A second surface of the substrate may be connected to the electronic device to touch a display of the electronic device through the connector.

Effects

A system for outputting an image for virtual reality may be provided.

A lens for providing virtual reality to a user may be provided.

BRIEF DESCRIPTION OF DRAWINGS

FIG. 7 is a flowchart illustrating a method of generating an image based on a calculated amount of smoke according to an example.

FIG. 8 is a flowchart illustrating a method of generating a target image based on whether a user exhales according to an example.

BEST MODE FOR CARRYING OUT THE INVENTION

Figure 1:
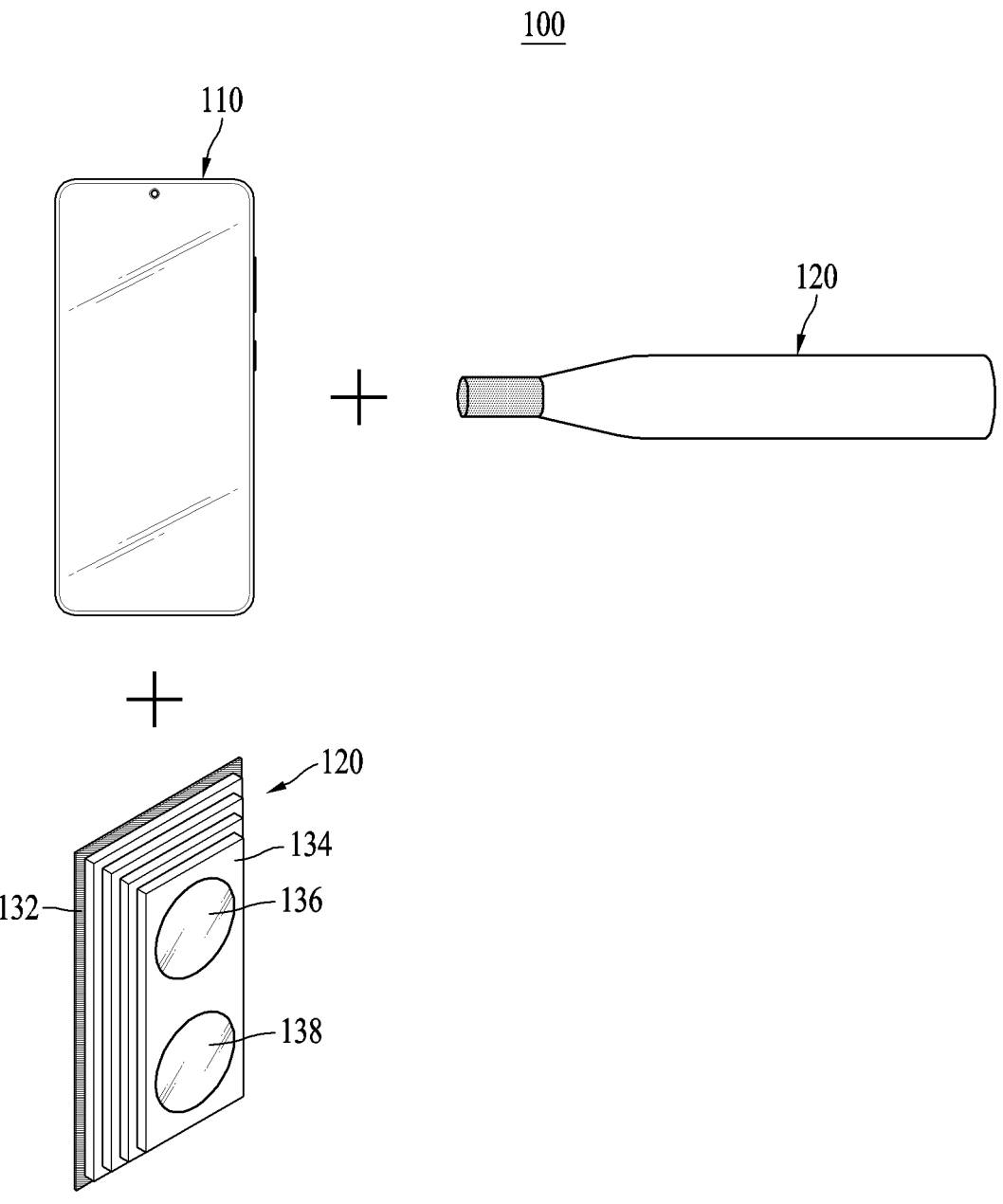
FIG. 1 illustrates a system for outputting an image according to an embodiment.

The following structural or functional descriptions of embodiments are merely intended for the purpose of describing the examples and the examples may be implemented in various forms. Accordingly, the embodiments are not to be construed as limited to the disclosure and should be understood to include all changes, equivalents, and replacements within the idea and the technical scope of the disclosure.

Terms, such as first, second, and the like, may be used herein to describe various components. Each of these terms is not used to define an essence, order or sequence of a corresponding component but is used merely to distinguish the corresponding component from other component(s). For example, a first component may be referred to as a second component, and similarly, the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which this disclosure pertains. Terms, such as those defined in commonly used dictionaries, are to be construed to have meanings matching with contextual meanings in the relevant art, and are not to be construed as having an ideal or excessively formal meaning unless expressly so defined herein.

Hereinafter, embodiments will be described in detail with reference to the accompanying drawings. In the descriptions of the embodiments referring to the accompanying drawings, like reference numerals refer to like elements and any repeated description related thereto will be omitted.

FIG. 1 illustrates a system for outputting an image according to an embodiment.

According to an embodiment, a system 100 for outputting an image may include an electronic device 110, an aerosol generating device 120, and a virtual reality device 130. For example, the electronic device 110 may be a mobile communication terminal such as a smartphone. A configuration of the electronic device 110 is described in detail with reference to FIG. 5. For example, the aerosol generating device 120 may be referred to as an electronic cigarette device or a smoking stick. The aerosol generating device 120 is described in detail below with reference to FIGS. 2 and 3.

A user may smoke as being provided with an aerosol generated by the aerosol generating device 120. For example, the aerosol generating device 120 may generate an aerosol using a material in a liquid-type cartridge or a solid-type cartridge in the aerosol generating device 120. A method by which the aerosol generating device 120 generates an aerosol is not limited to the embodiments described above.

According to an embodiment, the aerosol generating device 120 may generate information about smoking of the user using various sensors included in the aerosol generating device 120, and transmit the generated information to the electronic device 110. The electronic device 110 may generate an image corresponding to the received information. For example, the generated image may be an image used to provide virtual reality (VR) or augmented reality (AR) to the user.

According to an embodiment, an image output through the electronic device 110 may be transmitted to an eye of the user through the virtual reality device 130, and the user may experience VR through the provided image. The virtual reality device 130 may include a substrate 132, a screen 134, and one or more lenses 136 and 138. For example, the substrate 132 may be made of a transparent material. For example, the screen 134 may be disposed on a first surface of the substrate 132 and may include a plurality of ends capable of adjusting a distance between the substrate 132 and the lenses 136 and 138. A first end having a wider cross-sectional area may include a second end having a narrower cross-sectional area therein among the plurality of ends. For example, when the plurality of ends includes four ends, a first end having a widest cross-sectional area may sequentially include second, third, and fourth ends therein. For example, the lenses 136 and 138 may be disposed on a first end of the screen 134. For example, the lenses 136 and 138 may be ultrathin lenses.

According to an embodiment, the virtual reality device 130 may be manufactured in a form of a case or accessory of the electronic device 110.

According to an example, a structure of the virtual reality device 130 is described in detail with reference to FIG. 9.

According to an embodiment, a combination of the electronic device 110 and the virtual reality device 130 may configure a head mounted device (HMD). The user may wear the virtual reality device 130 combined with the electronic device 110 on a head as the HMD.

For example, the aerosol generating device 120 does not generate smoke (e.g., sidestream smoke) that may be visually observed, but the user may visually observe smoke through a virtual reality image provided through the electronic device 110 and the virtual reality device 130. The electronic device 110 may determine an inhalation state and an exhalation state during a smoking process through the aerosol generating device 120 and generate and output an image corresponding to a determined state.

The system 100 is described in detail below with reference to FIGS. 2 through 8.

Figure 2:
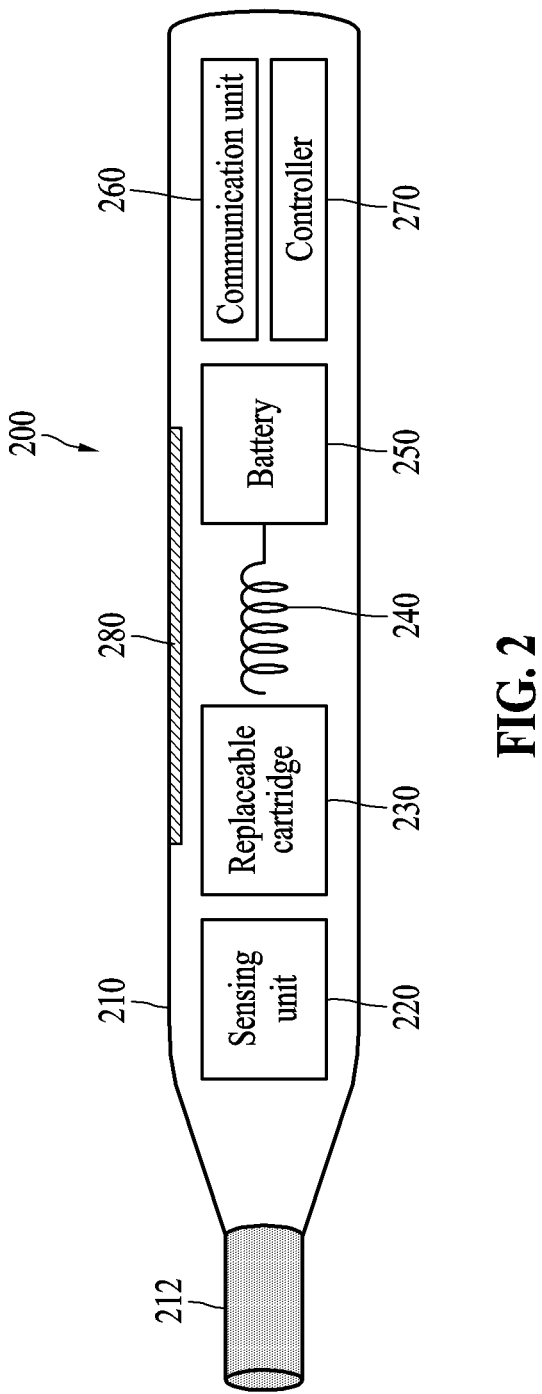
FIG. 2 is a block diagram illustrating an aerosol generating device according to an embodiment.

FIG. 2 is a block diagram illustrating an aerosol generating device according to an embodiment.

According to an embodiment, an aerosol generating device 200 (e.g., the aerosol generating device 120) may include a housing 210, a sensing unit 220, a replaceable cartridge 230, a coil 240, a battery 250, a communication unit 260, and a controller 270. For example, the coil 240 may generate heat by receiving energy from the battery 250. The replaceable cartridge 230 may generate an aerosol using the heat generated by the coil 240. A user may inhale the generated aerosol through an opening 212. A material in the replaceable cartridge 230 may be a liquid or solid. The material in the replaceable cartridge 230 may be an aerosol generating substrate. Additionally, various flavors, such as a tobacco flavor and an aroma flavor may be added to the material in the replaceable cartridge 230.

According to an embodiment, the sensing unit 220 may include one or more biosensors. For example, the biosensors may include one or more of a blood pressure sensor, an electrocardiogram sensor, or a blood oxygen saturation sensor. The biosensors may include sensors configured to measure biosignals of the user, and are not limited to the embodiments described above. When the user grabs the aerosol generating device 200, a biosignal of the user may be measured.

According to an embodiment, the sensing unit 220 may include a sensor configured to measure a body composition of the user. For example, the body composition may include a skeletal muscle mass, a basal metabolic rate, a body water content, and a body fat mass. When the user grabs the aerosol generating device 220, the body composition of the user may be measured.

According to an embodiment, the sensing unit 220 may include a puff detection sensor and a temperature detection sensor. In addition, the aerosol generating device 200 may be manufactured to have a structure in which external air may be introduced or internal gas may flow out.

According to an embodiment, the sensing unit 220 may include a pressure sensor. For example, the pressure sensor may sense whether the user holds the opening of the aerosol generating device 200 in a mouth.

According to an embodiment, the sensing unit 220 may include an infrared sensor. For example, the infrared sensor may measure a distance between the aerosol generating device 200 and the user or an electronic device (e.g., the electronic device 110 of FIG. 1) using infrared rays. As another example, the infrared sensor may measure a temperature by detecting heat reflected in the mouth when the user holds the opening in the mouth. As still another example, the infrared sensor may detect blocked infrared rays when the user holds the opening in the mouth. An inhalation action and an exhalation action of the user may be determined by the aerosol generating device 200 or the electronic device 110 based on whether infrared rays are blocked.

According to an embodiment, the aerosol generating device 200 may detect an inhalation by the user using one or more sensors of the sensing unit 220 and generate inhalation information on the inhalation by the user. For example, the inhalation information may include at least one of an average flow rate of an airflow according to the inhalation by the user, a cross-sectional area of a channel through which the airflow passes, or a duration of resistance to draw.

According to an embodiment, the sensing unit 220 may include a carbon dioxide sensor that measures an amount of carbon dioxide around the aerosol generating device. The carbon dioxide sensor may measure the amount of carbon dioxide as state information. For example, a value of the carbon dioxide sensor may increase due to an exhalation by the user.

According to an embodiment, the battery 250 may supply power to be used to operate the aerosol generating device 200. The battery 250 may supply power to heat the coil 240. In addition, the battery 250 may supply power required for operations of the other components (e.g., the sensing unit 220, the communication unit 260, and the controller 270) included in the aerosol generating device 200. The battery 250 may be a rechargeable battery or a disposable battery. The battery 250 may be, for example, a lithium polymer (LiPoly) battery. However, embodiments are not limited thereto.

According to an embodiment, the communication unit 260 may include at least one component for communicating with another electronic device. For example, the communication unit 260 may include a short-range wireless communication unit and a wireless communication unit.

According to an embodiment, the controller 270 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the processor may be implemented in other types of hardware. The controller 270 may control the other components (e.g., the sensing unit 220 and the communication unit 260) of the aerosol generating device 200.

According to an embodiment, the aerosol generating device 200 may further include the magnet 280. For example, the aerosol generating device 200 may be attached to one side surface of the electronic device (e.g., the electronic device 110 of FIG. 1) by means of the magnet 280. When the aerosol generating device 200 is attached to the electronic device, the battery 250 may be charged by a wireless charging scheme using energy transmitted from the electronic device.

Figure 3:
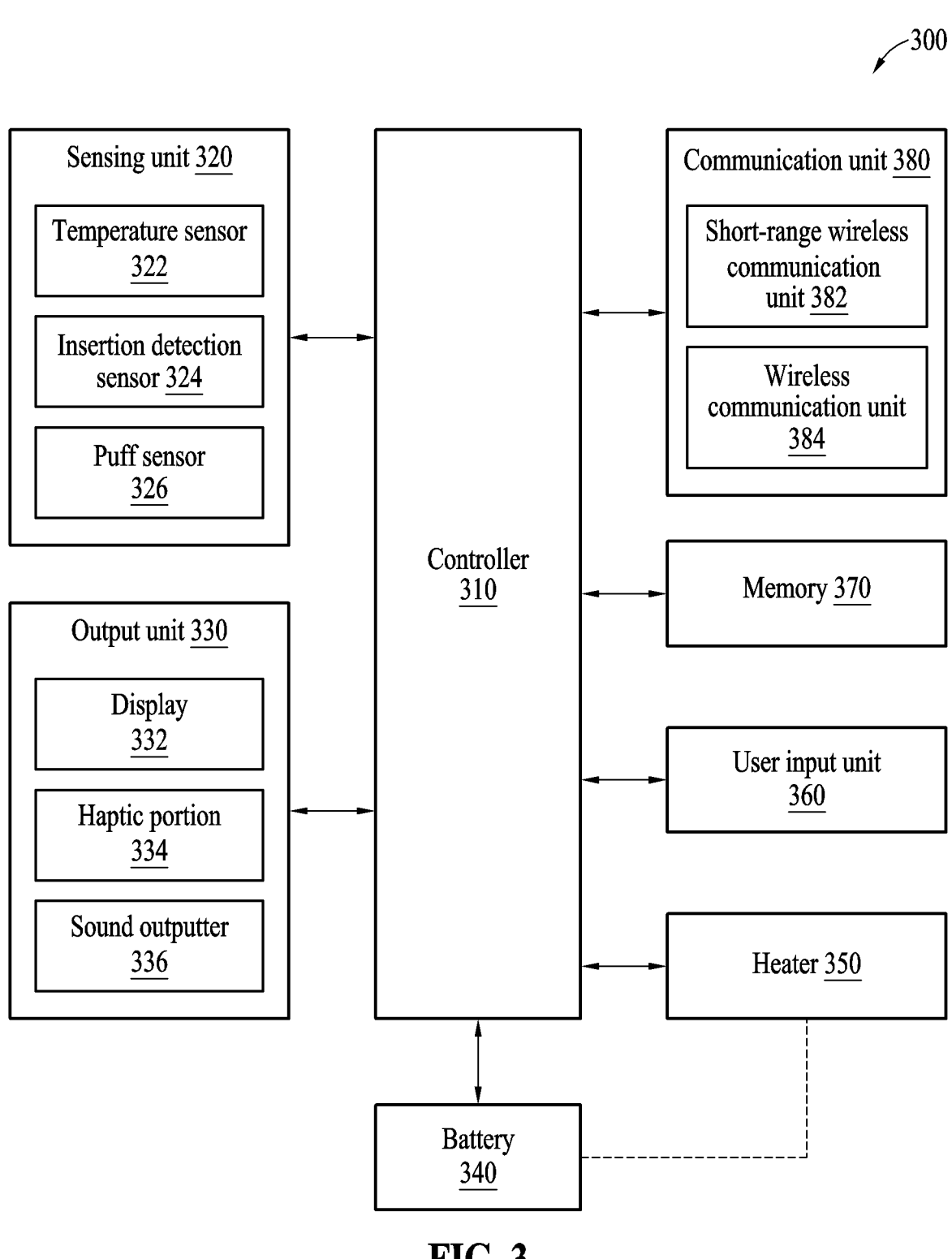
FIG. 3 is a block diagram illustrating an aerosol generating device according to another example.

FIG. 3 is a block diagram illustrating an aerosol generating device according to another example.

According to an embodiment, an aerosol generating device 300 (e.g., the aerosol generating device 120 of FIG. 1 or the aerosol generating device 200 of FIG. 2) may include a controller 310, a sensing unit 320, an output unit 330, a battery 340, a heater 350, a user input unit 360, a memory 370, and a communication unit 380. However, an internal structure of the aerosol generating device 300 is not limited to what is shown in FIG. 3. It is to be understood by one of ordinary skill in the art to which the disclosure pertains that some of the components shown in FIG. 3 may be omitted or new components may be added according to the design of the aerosol generating device 300.

The sensing unit 320 may sense a state of the aerosol generating device 300 or a state of an environment around the aerosol generating device 300, and transmit sensing information obtained through the sensing to the controller 310. Based on the sensing information, the controller 310 may control the aerosol generating device 300 to control operations of the heater 350, restrict smoking, determine whether an aerosol generating article (e.g., a cartridge, etc.) is inserted, display a notification, and perform other functions.

The sensing unit 320 may include at least one of a temperature sensor 322, an insertion detection sensor 324, and a puff sensor 326. However, embodiments are not limited thereto. For example, the sensing unit 320 may include sensors of the sensing unit 220 described above with reference to FIG. 2.

The temperature sensor 322 may sense a temperature at which the heater 350 (or an aerosol generating material) is heated. The aerosol generating device 300 may include a separate temperature sensor for sensing a temperature of the heater 350, or the heater 350 itself may perform a function as a temperature sensor. Alternatively, the temperature sensor 322 may be arranged around an opening to monitor a temperature of the opening of the aerosol generating device 300.

The insertion detection sensor 324 may sense whether the aerosol generating article is inserted and/or removed. The insertion detection sensor 324 may include, for example, at least one of a film sensor, a pressure sensor, a light sensor, a resistive sensor, a capacitive sensor, an inductive sensor, and an infrared sensor, which may sense a signal change by the insertion and/or removal of the aerosol generating article.

The puff sensor 326 may sense a puff from a user based on various physical changes in an airflow path or airflow channel. For example, the puff sensor 326 may sense the puff from the user based on any one of a temperature change, a flow change, a voltage change, and a pressure change.

The sensing unit 320 may further include at least one of a temperature/humidity sensor, an atmospheric pressure sensor, a magnetic sensor, an acceleration sensor, a gyroscope sensor, a position sensor (e.g., a global positioning system (GPS)), a proximity sensor, or a red, green, blue (RGB) sensor (e.g., an illuminance sensor), in addition to the above-described sensors 322 through 326. A function of each sensor may be intuitively inferable from its name by one of ordinary skill in the art, and thus a detailed description thereof will be omitted here.

The output unit 330 may output information about the state of the aerosol generating device 300 and provide the information to the user. The output unit 330 may include at least one of a display 332, a haptic portion 334, and a sound outputter 336. However, embodiments are not limited thereto. When the display 332 and a touchpad are provided in a layered structure to form a touchscreen, the display 332 may be used as an input device in addition to an output device.

The display 332 may visually provide the information about the aerosol generating device 300 to the user. The information about the aerosol generating device 300 may include, for example, a charging/discharging state of the battery 340 of the aerosol generating device 300, a preheating state of the heater 350, an insertion/removal state of the aerosol generating article, a limited usage state (e.g., an abnormal article detected) of the aerosol generating device 300, or the like, and the display 332 may externally output the information. The display 332 may be, for example, a liquid-crystal display panel (LCD), an organic light-emitting display panel (OLED), or the like. The display 332 may also be in the form of a light-emitting diode (LED) device.

The haptic portion 334 may provide the information about the aerosol generating device 300 to the user in a haptic way by converting an electrical signal into a mechanical stimulus or an electrical stimulus. The haptic portion 334 may include, for example, a motor, a piezoelectric element, or an electrical stimulation device.

The sound outputter 336 may provide the information about the aerosol generating device 300 to the user in an auditory way. For example, the sound outputter 336 may convert an electrical signal into a sound signal and externally output the sound signal.

The battery 340 may supply power to be used to operate the aerosol generating device 300. The battery 340 may supply power to heat the heater 350. In addition, the battery 340 may supply power required for operations of the other components (e.g., the sensing unit 320, the output unit 330, the user input unit 360, the memory 370, and the communication unit 380) included in the aerosol generating device 300. The battery 340 may be a rechargeable battery or a disposable battery. The battery 340 may be, for example, a lithium polymer (LiPoly) battery. However, embodiments are not limited thereto.

The heater 350 may receive power from the battery 340 to heat the aerosol generating material. For example, the heater 350 may be a low-power coil (e.g., the coil 240 of FIG. 2).

Although not shown in FIG. 3, the aerosol generating device 300 may further include a power conversion circuit (e.g., a direct current (DC)-to-DC (DC/DC) converter) that converts power of the battery 340 and supplies the power to the heater 350. In addition, when the aerosol generating device 300 generates an aerosol in an induction heating manner, the aerosol generating device 300 may further include a DC-to-alternating current (AC) (DC/AC) converter that converts DC power of the battery 340 into AC power.

The controller 310, the sensing unit 320, the output unit 330, the user input unit 360, the memory 370, and the communication unit 380 may receive power from the battery 340 to perform functions. Although not shown in FIG. 3, a power conversion circuit, for example, a low dropout (LDO) circuit or a voltage regulator circuit, which converts power of the battery 340 and supplies the power to respective components, may further be included.

In an embodiment, the heater 350 may be formed of a suitable predetermined electrically resistive material. The electrically resistive material may be a metal or a metal alloy including, for example, titanium, zirconium, tantalum, platinum, nickel, cobalt, chromium, hafnium, niobium, molybdenum, tungsten, tin, gallium, manganese, iron, copper, stainless steel, nichrome, or the like. However, embodiments are not limited thereto. In addition, the heater 350 may be implemented as a metal heating wire, a metal heating plate on which an electrically conductive track is arranged, a ceramic heating element, or the like. However, embodiments are not limited thereto.

In another embodiment, the heater 350 may be an induction heater. For example, the heater 350 may include a susceptor that heats the aerosol generating material by generating heat through a magnetic field applied by a coil.

In an embodiment, the heater 350 may include a plurality of heaters. For example, the heater 350 may include a first heater for heating a first cartridge and a second heater for heating a second cartridge. The first cartridge and the second cartridge may include different aerosol generating materials.

The user input unit 360 may receive information input from the user or may output information to the user. For example, the user input unit 360 may include a key pad, a dome switch, a touchpad (e.g., a contact capacitive type, a pressure resistive film type, an infrared sensing type, a surface ultrasonic conduction type, an integral tension measurement type, a piezo effect method, etc.), a jog wheel, a jog switch, or the like, but is not limited thereto In addition, although not shown in FIG. 3, the aerosol generating device 300 may further include a connection interface such as a universal serial bus (USB) interface, and may be connected to another external device through the connection interface such as a USB interface to transmit and receive information or to charge the battery 340.

The memory 370, which is hardware for storing various pieces of data processed in the aerosol generating device 300, may store data processed by the controller 310 and data to be processed by the controller 310. The memory 370 may include at least one type of storage medium of a flash memory type memory, a hard disk type memory, a multimedia card micro type memory, a card type memory (e.g., an SD, XE memory, etc.), a random-access memory (RAM), a static random-access memory (SRAM), a read-only memory (ROM), an electrically erasable programmable read-only memory (EEPROM), a programmable read-only memory (PROM), a magnetic memory; a magnetic disk, or an optical disk. The memory 370 may store an operating time of the aerosol generating device 300, a maximum number of puffs, a current number of puffs, at least one temperature profile, data associated with a smoking pattern of the user, or the like.

The communication unit 380 may include at least one component for communicating with another electronic device. For example, the communication unit 380 may include a short-range wireless communication unit 382 and a wireless communication unit 384.

The short-range wireless communication unit 382 may include a Bluetooth communication unit, a Bluetooth low energy (BLE) communication unit, a near field communication unit, a wireless local area network (WLAN) (Wi-Fi) communication unit, a ZigBee communication unit, an infrared data association (IrDA) communication unit, a Wi-Fi direct (WFD) communication unit, an ultra-wideband (UWB) communication unit, and an Ant+ communication unit. However, embodiments are not limited thereto.

The wireless communication unit 384 may include a cellular network communication unit, an Internet communication unit, a computer network (e.g., a LAN or a wide-area network (WAN)) communication unit, or the like. However, embodiments are not limited thereto. The wireless communication unit 384 may use subscriber information (e.g., international mobile subscriber identity (IMSI)) to identify and authenticate the aerosol generating device 300 in a communication network.

The controller 310 may control the overall operation of the aerosol generating device 300. In an embodiment, the controller 310 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the disclosure pertains that the processor may be implemented in other types of hardware.

The controller 310 may control the temperature of the heater 350 by controlling the supply of power from the battery 340 to the heater 350. For example, the controller 310 may control the supply of power by controlling the switching of a switching element between the battery 340 and the heater 350. In another example, a direct heating circuit may control the supply of power to the heater 350 according to a control command from the controller 310.

The controller 310 may analyze a sensing result obtained by the sensing of the sensing unit 320 and control processes to be performed thereafter. For example, the controller 310 may control power to be supplied to the heater 350 to start or end an operation of the heater 350 based on the sensing result obtained by the sensing unit 320. In another example, the controller 310 may control an amount of power to be supplied to the heater 350 and a time for which the power is to be supplied such that the heater 350 may be heated up to a predetermined temperature or maintained at a desired temperature, based on the sensing result obtained by the sensing unit 320.

The controller 310 may control the output unit 330 based on the sensing result obtained by the sensing unit 320. For example, when a number of puffs counted through the puff sensor 326 reaches a preset number, the controller 310 may inform the user that the aerosol generating device 300 is to be ended soon, through at least one of the display 332, the haptic portion 334, and the sound outputter 336.

According to an embodiment, the controller 310 may control a power supply time and/or a power supply amount for the heater 350 according to a state of the aerosol generating article sensed by the sensing unit 320.

Figure 4:
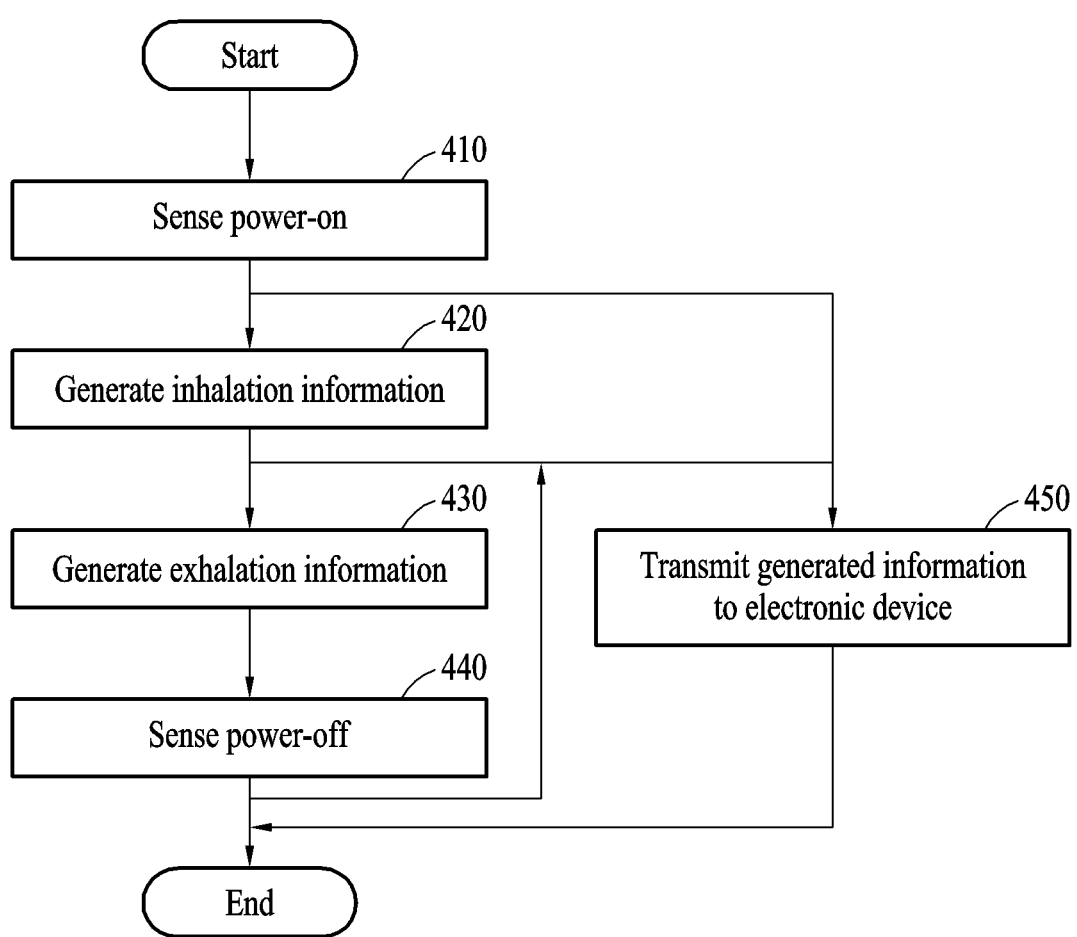
FIG. 4 is a flowchart illustrating a method of transmitting state information performed by an aerosol generating device according to an embodiment.

FIG. 4 is a flowchart illustrating a method of transmitting state information performed by an aerosol generating device according to an embodiment.

Operations 410 through 450 to be described below may be performed by an aerosol generating device (e.g., the aerosol generating device 120 of FIG. 1, the aerosol generating device 200 of FIG. 2, or the aerosol generating device 300 of FIG. 3).

Operations 410 through 440 may be operations of generating state information by sensing a state of the aerosol generating device, the operations performed by the aerosol generating device.

In operation 410, the aerosol generating device may sense its power-on. Subsequently, the aerosol generating device may transmit state information indicating its power-on to an electronic device (e.g., the electronic device 110 of FIG. 1) (in operation 450).

In operation 420, the aerosol generating device may sense an inhalation (i.e., a puff) by a user using one or more sensors of a sensing unit (e.g., the sensing unit 220 of FIG. 2 or the sensing unit 320 of FIG. 3) and generate inhalation information about the inhalation as the state information.

According to an embodiment, the aerosol generating device may sense the inhalation using a sensor (e.g., a pressure sensor, a temperature sensor, or an infrared sensor) when a preset portion (e.g., an opening or a tip portion) of the aerosol generating device comes into contact with a skin of the user. The pressure sensor may measure a pressure value as the state information. The temperature sensor may measure a temperature value as the state information. As another example, the aerosol generating device may sense the inhalation when an airflow is generated in the aerosol generating device by the user.

According to an embodiment, the inhalation information may include at least one of an average flow rate of an airflow according to the inhalation by the user, a cross-sectional area of a channel through which the airflow passes, and a duration of resistance to draw. The cross-sectional area of the channel through which the airflow passes may be predetermined according to the aerosol generating device.

According to an embodiment, the inhalation information may include a calculated inspiratory volume. For example, the aerosol generating device may calculate the inspiratory volume based on a speed (or the average flow rate) of the airflow, the cross-sectional area of the channel through which the airflow passes, and the duration of resistance to draw.

Subsequently, the aerosol generating device may transmit the inhalation information to the electronic device (in operation 450).

In operation 430, the aerosol generating device may sense an exhalation by the user using the sensing unit and generate exhalation information about the exhalation as the state information. For example, the aerosol generating device may sense the exhalation when the preset portion (e.g., the opening or the tip portion) of the aerosol generating device in contact with the skin of the user is taken away from the skin. As another example, the aerosol generating device may sense the exhalation when the airflow generated in the aerosol generating device by the user stops or flows in reverse. As still another example, the aerosol generating device may sense the exhalation when a sound generated when the user exhales is sensed using a microphone.

Subsequently, the aerosol generating device may transmit the exhalation information to the electronic device (in operation 430).

In operation 440, the aerosol generating device may sense its power-off. Subsequently, the aerosol generating device may transmit the state information indicating its power-off to the electronic device (in operation 450).

According to an embodiment, when the aerosol generating device is powered off, a link established between the aerosol generating device and the electronic device may be automatically canceled.

In operation 450, the aerosol generating device may transmit the generated state information to the electronic device.

According to an embodiment, while the aerosol generating device is powered on, the aerosol generating device may generate pose information of the aerosol generating device using at least one of a geomagnetic sensor, an acceleration sensor, a gyroscope sensor, and a position sensor continuously (e.g., at preset intervals). The aerosol generating device may transmit the pose information to the electronic device as the state information.

Figure 5:
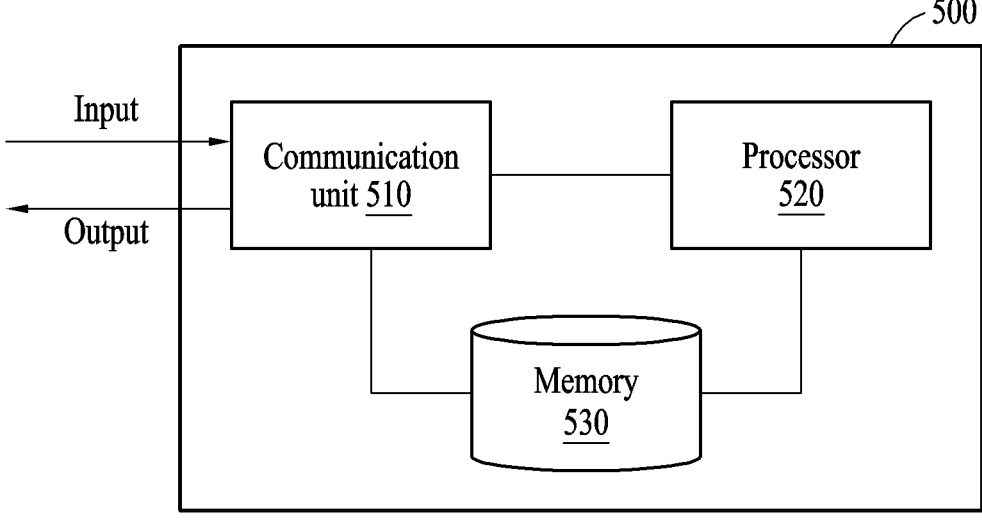
FIG. 5 is a configuration of an electronic device according to an embodiment.

FIG. 5 is a configuration of an electronic device according to an embodiment.

An electronic device 500 may include a communication unit 510, a processor 520, and a memory 530. For example, the electronic device 500 may be the electronic device 110 described above with reference to FIG. 1.

The communication unit 510 may be connected to the processor 520 and the memory 530 and transmit and receive data to and from the processor 520 and the memory 530. The communication unit 510 may be connected to another external device and transmit and receive data to and from the external device. The expression used herein "transmitting and/or receiving A" may be construed as transmitting and/or receiving "information or data that indicates A."

The communication unit 510 may be implemented as circuitry in the electronic device 500. For example, the communication unit 510 may include an internal bus and an external bus. As another example, the communication unit 510 may be an element that connects the electronic device 500 to the external device. The communication unit 510 may be an interface. The communication unit 510 may receive data from the external device and transmit the data to the processor 520 and the memory 530.

The processor 520 may process the data received by the communication unit 510 and data stored in the memory 530. A "processor" may be a hardware-implemented data processing device having a physically structured circuit to execute desired operations. The desired operations may include, for example, code or instructions included in a program. For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 520 may execute computer-readable code (for example, software) stored in a memory (e.g., the memory 530) and instructions triggered by the processor 520.

The memory 530 may store the data received by the communication unit 510 and the data processed by the processor 520. For example, the memory 530 may store the program (or an application, or software). The program to be stored may be a set of syntaxes that are coded to output an image and are executable by the processor 520.

According to an aspect, the memory 530 may include at least one volatile memory, non-volatile memory, RAM, flash memory, a hard disk drive, and an optical disk drive.

The memory 530 may store an instruction set (e.g., software) for operating the electronic device 500. The instruction set for operating the electronic device 500 is executed by the processor 520.

The communication unit 510, the processor 520, and the memory 530 will be described in detail below with reference to FIGS. 6 through 8.

Figure 6:
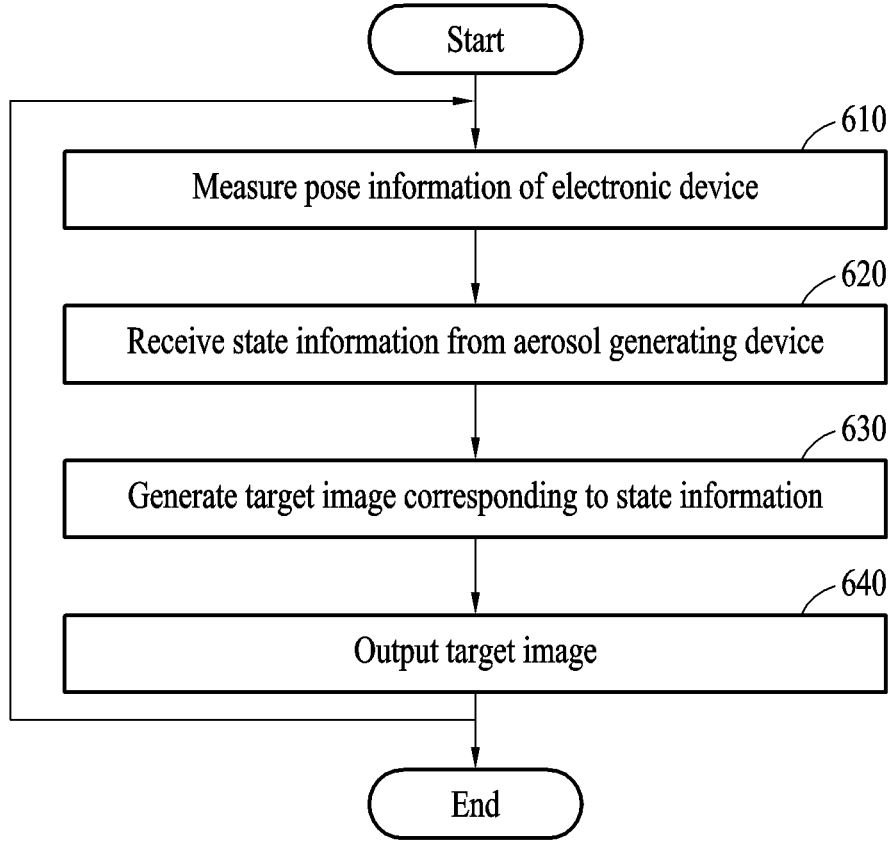
FIG. 6 is a flowchart illustrating a method of outputting an image performed by an electronic device according to an embodiment.

FIG. 6 is a flowchart illustrating a method of outputting an image performed by an electronic device according to an embodiment.

Operations 610 through 640 may be performed by the electronic device 500 (e.g., the electronic device 110 of FIG. 1) described above with reference to FIG. 5.

In operation 610, the electronic device 500 may measure pose information of the electronic device 500. For example, the electronic device 500 may measure the pose information of the electronic device 500 using at least one of an acceleration sensor and a gyroscope sensor.

According to an embodiment, the measured pose information may be used to provide an image provided to a user. For example, when an HMD includes a combination of the electronic device 500 and a virtual reality device (e.g., the virtual reality device 130 of FIG. 1), the electronic device 500 may be fixed to a head (or a face) of the user, and a pose of the electronic device 500 may be a viewpoint of the user. Since a VR image provided to the user may change based on the viewpoint of the user, the pose information of the electronic device 500 may be used to generate the image.

In operation 620, the electronic device 500 may receive state information of an aerosol generating device from the aerosol generating device (e.g., the aerosol generating device 120 of FIG. 1, the aerosol generating device 200 of FIG. 2, or the aerosol generating device 300 of FIG. 3).

According to an embodiment, the state information may be the pose information of the aerosol generating device. For example, the pose information of the aerosol generating device may be a pose of the user holding the aerosol generating device. Poses of an arm and a hand of the user holding the aerosol generating device may change in VR based on the pose information of the aerosol generating device. For example, actions of the user that involve an action of bringing the aerosol generating device to a mouth of the user, an action of holding the aerosol generating device in the mouth, or the like, may appear in VR.

According to an embodiment, the state information may be inhalation information about an inhalation.

According to an aspect, the inhalation information may be information used to determine whether the user holds the aerosol generating device in the mouth. For example, the inhalation information may be a temperature value of an opening of the aerosol generating device measured by a temperature sensor. As another example, the inhalation information may be a distance between the electronic device 500 (or the user) and the aerosol generating device measured by an infrared sensor. As still another example, the inhalation information may be a temperature value of heat reflected in the mouth measured by the infrared sensor. As yet another example, the inhalation information may indicate that an airflow is generated in the aerosol generating device.

According to another aspect, the inhalation information may include at least one of an average flow rate of an airflow according to an inhalation by the user, a cross-sectional area of a channel through which the airflow passes, and a duration of resistance to draw. The cross-sectional area of the channel through which the airflow passes may be predetermined according to the aerosol generating device. Additionally, the inhalation information may include a calculated inspiratory volume. For example, the inspiratory volume may be calculated based on a speed (or the average flow rate) of the airflow, the cross-sectional area of the channel through which the airflow passes, and the duration of resistance to draw.

According to an embodiment, an inspiratory volume and an expiratory volume may be measured in advance respectively before operation 610 is performed, and the measured inspiratory volume and expiratory volume may be stored in the electronic device 500. When an inspiratory volume and an expiratory volume are stored in advance as default values, the electronic device 500 may not calculate the inspiratory volume and the expiratory volume in real time and only determine whether the user starts inhaling through the aerosol generating device and then starts exhaling.

According to an embodiment, the state information may be exhalation information about an exhalation. For example, the exhalation information may be information used to determine whether the user removes the aerosol generating device from the mouth. For example, the exhalation information may be a temperature value of the opening of the aerosol generating device measured by the temperature sensor. As another example, the exhalation information may be the distance between the electronic device 500 (or the user) and the aerosol generating device measured by the infrared sensor. As still another example, the exhalation information may be the temperature value of heat reflected in the mouth measured by the infrared sensor. As yet another example, the exhalation information may indicate that there is no airflow in the aerosol generating device.

Additionally, the electronic device 500 may determine an exhalation by the user using a sensor of the electronic device 500 in addition to the exhalation information received from the aerosol generating device. For example, when the aerosol generating device present in an image captured by a camera becomes invisible, it is considered that the user lowers an arm, and this action may be considered to be an exhalation. As another example, when a value measured by a carbon dioxide sensor of the electronic device 500 increases, the exhalation by the user may be determined. As still another example, when a sound received through a microphone of the electronic device 500 corresponds to a sound of exhaling, the exhalation by the user may be determined.

In operation 630, the electronic device 500 may generate a target image corresponding to the state information.

According to an embodiment, the electronic device 500 may determine a viewpoint of an image to be generated based on the pose information of the electronic device 500. A viewpoint of the target image may correspond to a viewpoint of an eye of the user.

According to an embodiment, the electronic device 500 may determine a position and a pose of the arm (or the hand)

of the user and a position and a pose of the aerosol generating device disposed in a virtual environment based on the pose information of the aerosol generating device. For example, the electronic device 500 may generate the target image based on the aerosol generating device disposed in the virtual environment and the viewpoint of the image. For example, when the user gazes toward the aerosol generating device, the target image may be generated such that the aerosol generating device appears. As another example, when the user gazes upward, the aerosol generating device does not appear, and the target image may be generated based on a VR scene (e.g., a background) corresponding to the gaze.

According to an embodiment, a shape of an object of the aerosol generating device output in the target image may be deformable. For example, the shape of the object of the aerosol generating device may be displayed in the target image such that the shape is identical to the actual aerosol generating device. As another example, the shape of the object of the aerosol generating device may have a cigarette shape different from the actual aerosol generating device (e.g., an electronic cigarette).

According to an embodiment, the electronic device 500 may generate the target image based on the inhalation information. For example, when inhalation continues, the target image may be generated such that a graphic effect of an end portion of the aerosol generating device burning appears.

According to an embodiment, the electronic device 500 may generate the target image based on the exhalation information. For example, when an exhalation is initiated, the target image that is perceived as if smoke (e.g., sidestream smoke) puffs from the mouth of the user in VR may be generated. A shape, an amount, or a duration of smoke to be output may be determined based on at least one of the inhalation information and the exhalation information. For example, as an inspiratory volume calculated based on the inhalation information increases, the amount and the duration of smoke may increase. As another example, as intensity of inhalation or intensity of exhalation increases, it may be determined that the shape of smoke is a shape that extends farther. The intensity of exhalation may be determined based on a sound of exhaling received through the microphone.

According to an embodiment, the electronic device 500 may determine the shape, amount, or duration of smoke to be output based on a value preset by the user. For example, the user may set the shape of smoke to be a flame shape not a general sidestream smoke shape.

In operation 640, the electronic device 500 may output the target image through the display of the electronic device 500.

According to an embodiment, the target image may be transmitted to the eye of the user through at least one lens (e.g., the lenses 136 and 138 of FIG. 1) positioned between the eye of the user and the display of the electronic device 500. A VR image or an AR image may be provided to the user by an optical system including a display, a lens, and a target image.

Providing visible sidestream smoke to the user through VR may enhance the satisfaction the user feels when the user smokes, even when no actual sidestream smoke is generated by the aerosol generating device. In addition, the user may customize the shape and the like of the smoke to be output through VR using the electronic device 500.

FIG. 7 is a flowchart illustrating a method of generating an image based on a calculated amount of smoke according to an example.

According to an embodiment, operation 630 described above with reference to FIG. 6 may include operations 710 and 720 to be described hereinafter.

In operation 710, the electronic device 500 may calculate an amount of smoke based on inhalation information received as state information. For example, the electronic device 500 may calculate an inspiratory volume based on a speed (or an average flow rate) of an airflow received by an aerosol generating device, a cross-sectional area of a channel through which the airflow passes, and a duration of resistance to draw and calculate the amount of smoke based on the calculated inspiratory volume. For example, the amount of smoke may be calculated based on the calculated inspiratory volume and a user setting. The user setting related to the amount of smoke may be one of no smoke, small, normal, large, and very large. For example, weights for no smoke, small, normal, large, and very large may be 0, 0.5, 1, 1.5, and 2, respectively. The amount of smoke may be calculated based on a product of the calculated inspiratory volume and a weight.

According to an embodiment, the duration of smoke may be calculated together with the amount of smoke. The duration of smoke may be calculated based on a preset (or prestored) reference exhalation duration of the user. For example, the user may generate a smoking pattern in advance using the aerosol generating device, and the reference exhalation duration may be determined based on the smoking pattern. The electronic device 500 may determine the duration of smoke based on the reference exhalation duration and a user setting. The user setting may be one of short, medium, and long. For example, weights for short, medium, and long may be 0.8, 1, and 1.2, respectively. The duration of smoke may be calculated based on a product of the calculated reference exhalation duration and a weight.

According to an embodiment, the duration of smoke may be determined based on the calculated amount of smoke and intensity of exhalation. For example, even when the calculated amount of smoke is large, the higher the intensity of exhalation is measured, the shorter the duration of smoke.

In operation 720, the electronic device 500 may generate a target image based on the amount of smoke. For example, the target image may be a video including a plurality of frames. The electronic device 500 may generate the target image in VR such that the calculated amount of smoke appears. For example, the target image may be generated such that sidestream smoke is shown based on the calculated amount of smoke and the calculated duration of smoke. A viewpoint of the generated target image may correspond to a gaze of the user in VR.

According to an embodiment, a shape of smoke in the target image may vary depending on a user setting. For example, the shape of smoke may be customized to have a shape such as a flame shape or a donut shape.

FIG. 8 is a flowchart illustrating a method of generating a target image based on whether a user exhales according to an example.

According to an embodiment, operation 810 may be further performed before operation 630 described above with reference to FIG. 6 may be performed. Operation 630 may include operation 820.

In operation 810, the electronic device 500 may determine whether a user exhales using a sensor of the electronic device 500. For example, when an aerosol generating device present in an image captured by a camera of the electronic device 500 becomes invisible, it is considered that the user lowers an arm, and this action may be considered to be an exhalation. As another example, when a value measured by a carbon dioxide sensor of the electronic device 500 increases, the exhalation by the user may be determined. As still another example, when a sound received through a microphone of the electronic device 500 corresponds to a sound of exhaling, the exhalation by the user may be determined.

In operation 820, the electronic device 500 may generate a target image based on a calculated amount of smoke when the user exhales.

Figure 9A:
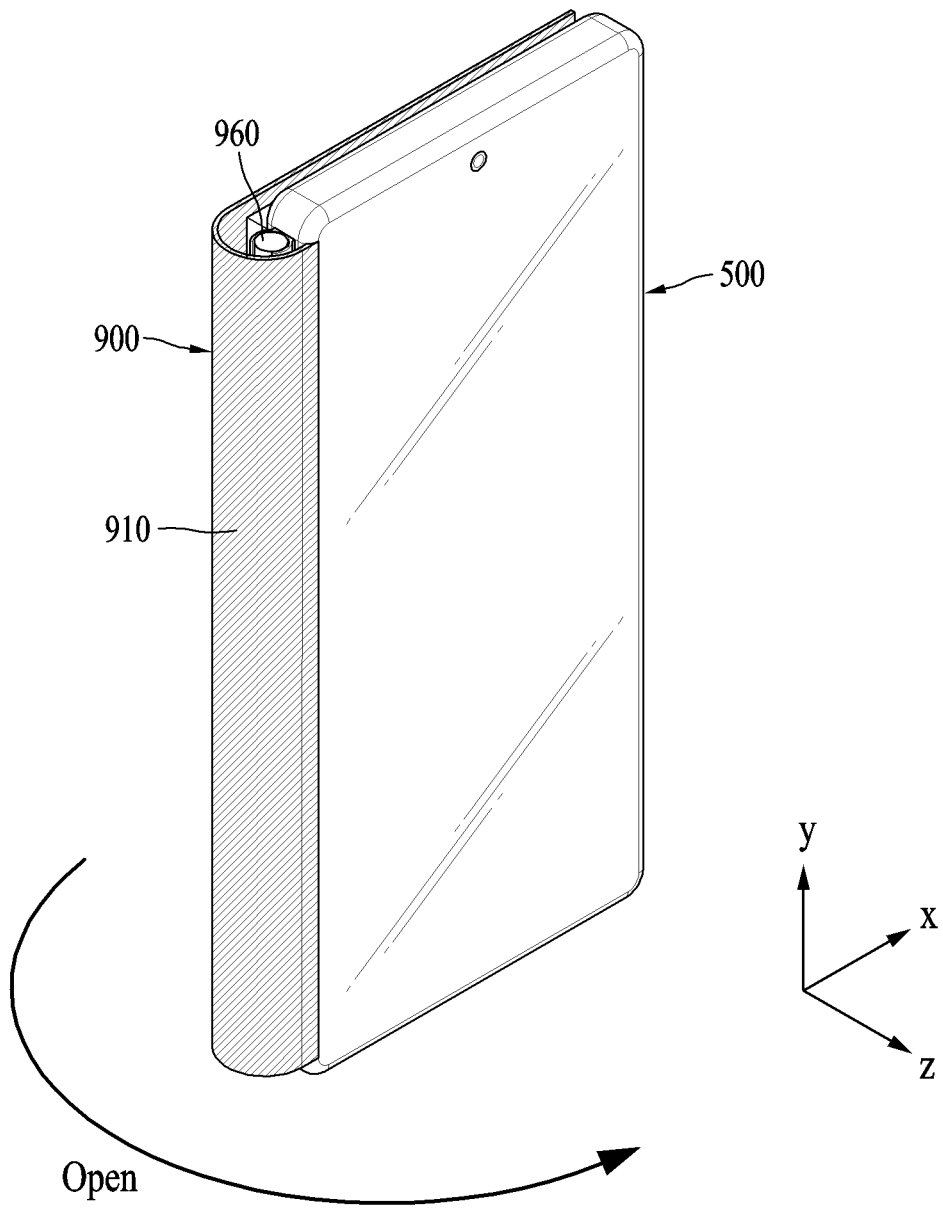
FIGS. 9A through 9C illustrate a structure of a virtual reality device according to an embodiment.
Figure 9B:
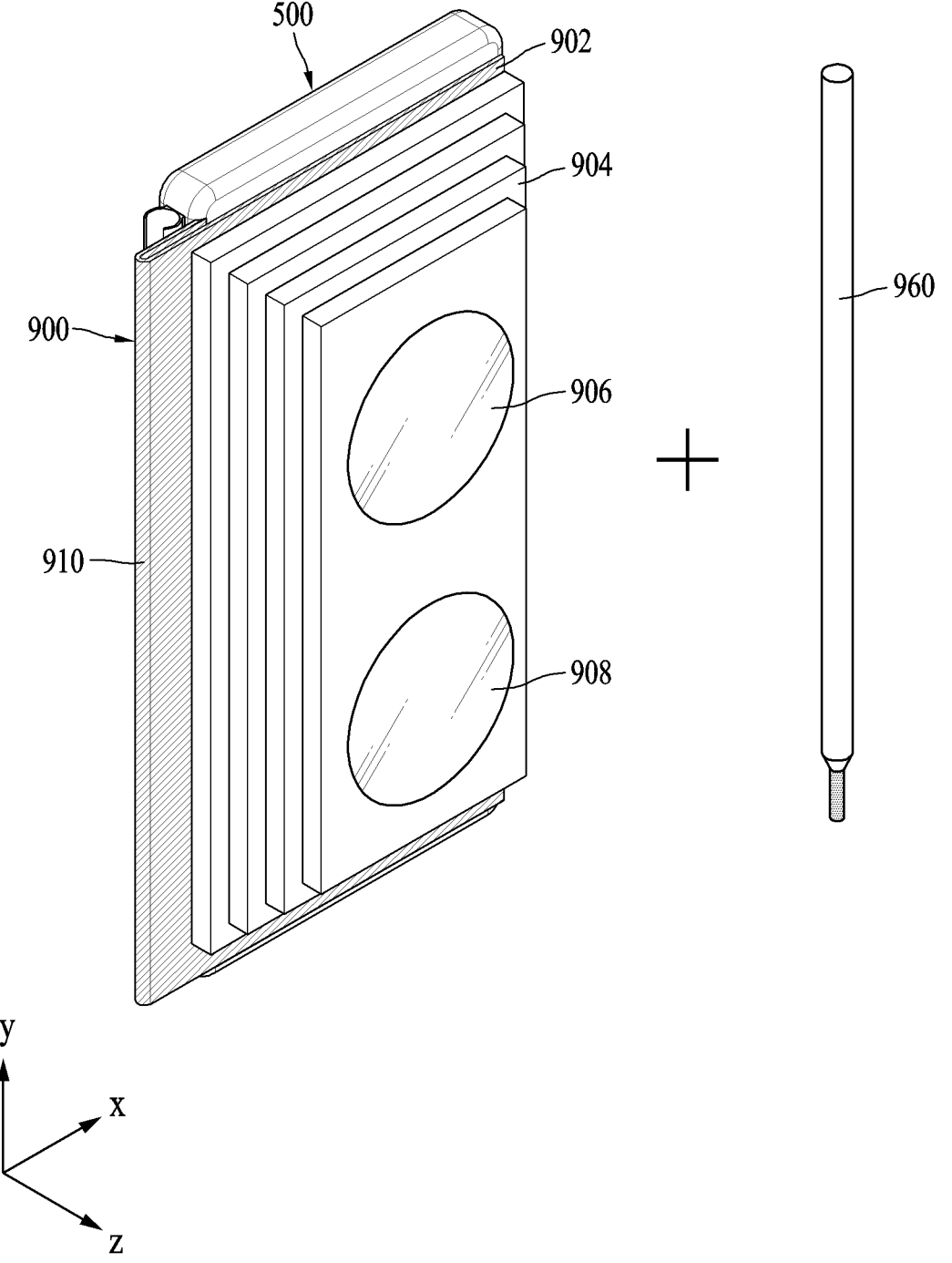
Figure 9C:
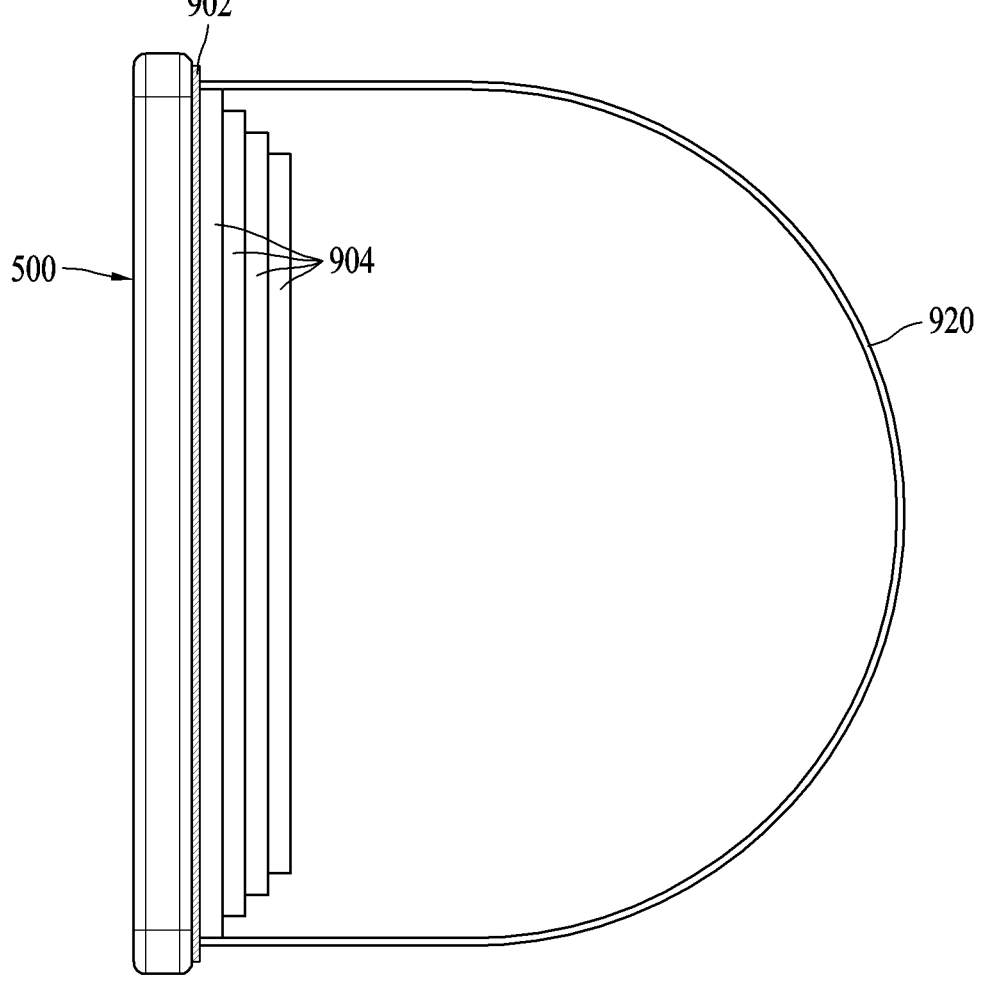

FIGS. 9A through 9C illustrate a structure of a virtual reality device according to an embodiment.

FIG. 9A illustrates a first state of a virtual reality device 900 (e.g., the virtual reality device 130 of FIG. 1) and the electronic device 500 (e.g., the electronic device 110 of FIG. 1). The first state may be a closed state.

The virtual reality device 900 may include a connector 910, and the virtual reality device 900 may be attached to the electronic device 500 through the connector 910. For example, the connector 910 may be attached to one side surface of the electronic device 500 using a magnet. A screen 904 of the virtual reality device 900 may be accommodated to be positioned between a substrate 902 and a rear surface of the electronic device 500. In this example, an aerosol generating device 960 (e.g., the aerosol generating device 120 of FIG. 1 or the aerosol generating device 200 of FIG. 2) may be disposed in an inner space of the connector 910. For example, the aerosol generating device 960 may be attached to the inner space of the connector 910 using the magnet. As another example, the connector 910 may include a case to which the aerosol generating device 960 may be attached.

According to an embodiment, the substrate 902 may rotate with respect to the electronic device 500 about a connecting axis of the connector 910 such that the screen 904 is positioned between the substrate 902 and the electronic device 500.

FIG. 9B illustrates a second state of the virtual reality device 900 and the electronic device 500. The second state may be an open state. In the second state, a second surface of the substrate 902 may be connected to the electronic device 500 to touch a display of the electronic device 500 through the connector 910.

In the second state, ends of the screen 904 may protrude to extend outwards from the substrate 902. As the ends protrude, a distance between the substrate 902 and lenses 906 and 908 may be adjusted.

In the second state, a user may separate the aerosol generating device 960 from the electronic device 500 or the virtual reality device 900 and use the aerosol generating device 960.

FIG. 9C illustrates the virtual reality device 900 and the electronic device 500 that may be used as an HMD. The virtual reality device 900 may further include a fixing member 920 that may be connected to the substrate 902 or the screen 904 to fix the virtual reality device 900 to a face of the user. For example, the fixing member 920 may be accommodated between the substrate 902 and the rear surface of the electronic device 500 in the first state.

The user may place the lenses 906 and 908 of the virtual reality device 900 in front of eyes of the user through the fixing member 920. The user may experience virtual reality by observing a target image output through the display of the electronic device 500 through the lenses 906 and 908.

The methods according to the above-described examples may be recorded in non-transitory computer-readable media including program instructions to implement various operations of the above-described example. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM disks or DVDs; magneto-optical media such as floptical disks; and hardware devices that are specially configured to store and perform program instructions, such as ROM, RAM, flash memory, and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

The software may include a computer program, a piece of code, an instruction, or some combination thereof, to independently or uniformly instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

As described above, although the embodiments have been described with reference to the limited drawings, one of ordinary skill in the art may apply various technical modifications and variations based thereon. For example, suitable results may be achieved if the described techniques are performed in a different order and/or if components in a described system, architecture, device, or circuit are combined in a different manner or replaced or supplemented by other components or their equivalents.

Therefore, other implementations, other embodiments, and equivalents to the claims are also within the scope of the following claims.

The invention claimed is:

1. A virtual reality device comprising:
a substrate made of a transparent material;
a connector connected to the substrate and configured to provide a connection with an electronic device;
a screen disposed on a first surface of the substrate and configured to form a space between the substrate and a lens; and
one or more lenses disposed on one end of the screen,
wherein the screen comprises a plurality of ends configured to adjust a distance between the substrate and the lenses,
wherein a first end having a wider cross-sectional area comprises a second end having a narrower cross-sectional area therein among the plurality of ends of the screen,
wherein the substrate is rotatable with respect to the electronic device about a connecting axis of the connector such that the screen is positioned between the substrate and a rear surface of the electronic device in a closed state,
wherein, as the substrate rotates with respect to the electronic device, the first surface of the substrate faces the rear surface of the electronic device in the closed state, and a second surface of the substrate faces a front surface of the electronic device in an opened state,
wherein an aerosol generating device is disposed in an inner space of the connector in the closed state in which the screen is positioned between the substrate and the rear surface of the electronic device, and a display of the electronic device is exposed,
wherein, in the opened state, the substrate is positioned between the screen and the display of the electronic device such that the second surface of the substrate touches the display of the electronic device through the connector, and
wherein the aerosol generating device is configured to be accessible to a user only in the opened state, among the opened state and the closed state.

2. The virtual reality device of claim 1, further comprising:
a fixing member connected to the substrate or the screen and configured to fix the virtual reality device to a face of the user.

3. The virtual reality device of claim 1, wherein the electronic device is a mobile communication terminal.

4. The virtual reality device of claim 1, wherein the aerosol generating device comprises:
a battery;
a cartridge comprising an aerosol generating substrate;
a coil configured to heat the cartridge;
a sensing unit configured to sense a state of the aerosol generating device;
a communication unit configured to transmit information on the state to an external device; and
a controller configured to control the aerosol generating device, and
wherein the controller is configured to:
generate state information by sensing the state of the aerosol generating device through the sensing unit; and
transmit the generated state information to the electronic device connected to the aerosol generating device through wireless communication.

5. A virtual reality system comprising:
an electronic device;
an aerosol generating device; and
a virtual reality device comprising:
a substrate made of a transparent material;
a connector connected to the substrate and configured to provide a connection with the electronic device;
a screen disposed on a first surface of the substrate and configured to form a space between the substrate and a lens; and
one or more lenses disposed on one end of the screen,
wherein the screen comprises a plurality of ends configured to adjust a distance between the substrate and the lenses,
wherein a first end having a wider cross-sectional area comprises a second end having a narrower cross-sectional area therein among the plurality of ends of the screen,
wherein the substrate is rotatable with respect to the electronic device about a connecting axis of the connector such that the screen is positioned between the substrate and a rear surface of the electronic device in a closed state, wherein, as the substrate rotates with respect to the electronic device, the first surface of the substrate faces the rear surface of the electronic device in the closed state, and a second surface of the substrate faces a front surface of the electronic device in an opened state, wherein the aerosol generating device is disposed in an inner space of the connector in the closed state in which the screen is positioned between the substrate and the rear surface of the electronic device, and a display of the electronic device is exposed, wherein, in the opened state, the substrate is positioned between the screen and the display of the electronic device such that the second surface of the substrate touches the display of the electronic device through the connector, wherein the aerosol generating device is configured to be accessible to a user only in the opened state, among the opened state and the closed state, wherein the aerosol generating device is configured to:

generate state information by sensing a state of the aerosol generating device, and transmit the generated state information to the electronic device connected to the aerosol generating device through wireless communication, wherein the electronic device is configured to:

generate a target image corresponding to the state information, and output the target image through the display of the electronic device, and wherein the target image is transmitted to an eye of the user through the virtual reality device, and virtual reality is provided to the user.

6. The virtual reality system of claim 5, wherein the aerosol generating device comprises:

a battery;

a cartridge comprising an aerosol generating substrate;

a coil configured to heat the cartridge;

a sensing unit configured to sense the state of the aerosol generating device;

a communication unit configured to transmit information on the state to an external device; and a controller configured to control the aerosol generating device.

7. The virtual reality system of claim 6, wherein the aerosol generating device further comprises a magnet configured to attach the aerosol generating device to one side surface of the electronic device.

8. The virtual reality system of claim 7, wherein the controller is configured to, when the aerosol generating device is attached to the one side surface of the electronic device through the magnet, charge the battery through a wireless charging scheme.

9. The virtual reality system of claim 5, wherein the target image is generated based on a viewpoint of the eye of the user such that a viewpoint of the target image corresponds to a gaze direction of the eye of the user.

* * * * *